May 13, 1952     M. J. BAMBER     2,596,116
AIRPLANE PRESSURE DIFFERENTIAL STALL INDICATOR
Filed Sept. 16, 1948
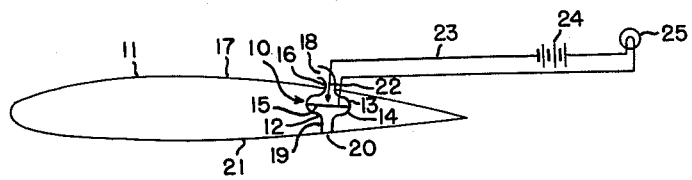
Fig. 1.
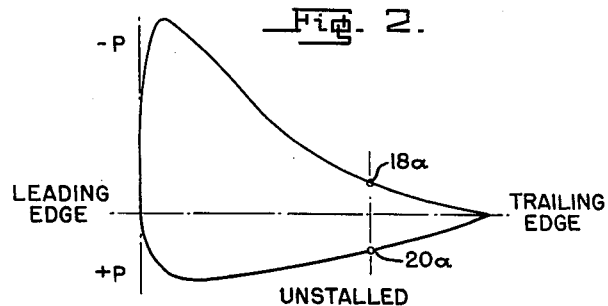
Fig. 2. UNSTALLED
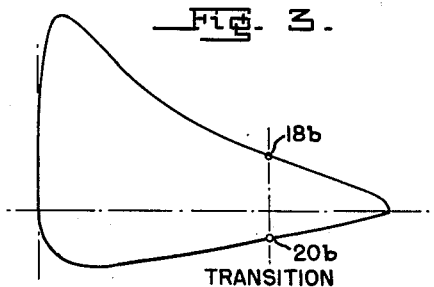
Fig. 3. TRANSITION
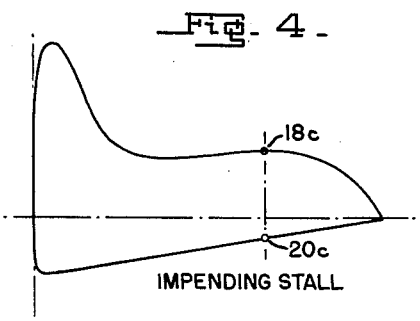
Fig. 4. IMPENDING STALL
INVENTOR.
Millard John Bamber
BY *N. J. Houfeld*
ATTORNEY Patented May 13, 1952

2,596,116

UNITED STATES PATENT OFFICE 2,596,116

AIRPLANE PRESSURE DIFFERENTIAL STALL INDICATOR

Millard John Bamber, Cabin John, Md.

Application September 16, 1948, Serial No. 49,636

3 Claims. (Cl. 200—81.9)

(Granted under the act of March 3, 1883, as amended April 30, 1928; 370 O. G. 757)

The invention relates to improvements in stall warning devices and more specifically to an improved device for warning the pilot of an airplane when the airflow over the wing is such that a predetermined increase in angle of attack will stall the wing.

Changes in wing loading, normal accelerations, wing surface conditions, altitude and control deflections cause large changes in air speed and angle of attack of a stall. Because of these conditions affecting the approaching stall, a stall warning device should be independent of air-speed and angle of attack while indicating the actual airflow conditions existing over the wing surface.

The primary object of the invention is the provision of an airplane stall warning device that is chiefly controlled by the actual airflow conditions adjacent the wing.

The invention also aims to provide an airplane stall warning device that is light in weight, offers little air resistance, is not liable to get out of order, can be applied to various types of airplanes and can be arranged to give a warning upon the occurrence of almost any given degree of airflow deterioration over the wing.

Other objects and many of the attendant advantages of this invention will be readily appreciated as the same becomes better understood by reference to the following detailed description when considered in connection with the accompanying drawings wherein:

Figure 1 is a view diagrammatically showing the stall warning device applied to an airplane wing.

Figures 2-4 are diagrams showing typical pressure distributions about an airfoil at high angles of attack during unstalled, transition and impending-stall flight conditions, respectively.

In the drawing, which for the purpose of illustration shows only a preferred embodiment of the invention, the numeral 10 generally designates the stall warning device applied to a wing 11. Disposed within the wing 11 is a casing 12 comprising upper and lower chambers 13, 14 separated by a flexible diaphragm 15. Communicating with the upper chamber 13 is a tubular duct 16 that extends upwardly through the upper surface 17 of the wing 11 and terminates in a forwardly directed mouth 18 near the wing surface. Extending downwardly from the lower chamber 14 is a tubular duct 19 terminating in a downwardly directed port 20 in the lower surface 21 of the wing. Disposed in the upper chamber 13 is a contact 22 normally spaced from the diaphragm 15 and forming part of a series circuit 23 including a current source 24 and an alarm device such as an electric light 25.

When the diaphragm 15 is deflected upwardly, the contact 22 is closed whereby the light 25 is energized so as to warn the pilot. For the diaphragm to move up, the pressure in the lower chamber must be greater than in the upper chamber 13. When there is no pressure difference between the upper and lower chambers or when the pressure is greater in the upper chamber, no contact will be made.

Figures 2-4 show at points 20a, 20b, 20c the magnitude of the positive pressure at point 20 on the lower surface of wing 11 of Fig. 1. This pressure urges diaphragm 15 up. Inasmuch as the mouth 18 near the upper surface of the wing 11 faces in the direction of travel of the airplane, the pressure in tube 16 and in the upper chamber 13 is the resultant of the negative local pressure shown at points 18a, 18b, 18c plus the impact pressure of the local velocity at the mouth 18. For the unstalled condition shown in Fig. 2, the local velocity (not shown) is about equal to that of the free air stream but its value is considerably less in the transition stage of Fig. 3 and is practically zero for the condition of impending stall in Fig. 4.

The resulting pressures on the diaphragm will, therefore, be downward for the unstalled condition of Fig. 2 whereby the contact is held open. For the transition stage of Fig. 3, the addition of pressures will produce a resultant pressure on the diaphragm of about zero. This resultant pressure can be made either positive or negative by choosing the proper position of the lower surface opening 20 forward or aft along the wing chord and by varying the distance of the mouth 18 from the upper surface of the wing. For conventional wing profiles, the location of mouth 18 and port 20 will be somewhere between 50% and 95% of the chord length from the leading edge of the wing. In the example shown, the openings 18, 20 are about 70% of the chord length from the leading edge. For the condition of impending stall in Fig. 4, the resultant of the pressures on both sides of the diaphragm is upward whereby contact 22 is closed and the warning light energized.

From the foregoing it is clear that a stall warning device has been provided which in operation is dependent on the type of airflow over the wing and not on airspeed. This is particularly important when ice is collecting on the wing or in accelerated flight.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

I claim:

1. In combination, an airplane wing having an upper surface, a lower surface, a leading edge and a trailing edge; a casing disposed between said two surfaces aft of said leading edge and adjacent the area of said trailing edge; said casing defining an upper chamber exposed to local pressure plus impact pressure of local velocity at said upper surface, and a lower chamber exposed to local pressure but not to dynamic pressure at said lower surface; said chambers being separated by a flexible diaphragm; an upper duct communicating with said upper chamber and extending upwardly through said upper surface; said upper duct terminating in a forwardly directed mouth; a lower duct in communication with said lower chamber extending downwardly through said lower surface and terminating therein with a downwardly directed mouth; and contact means operated by a predetermined movement of said diaphragm.

2. In combination, an airplane wing having an upper surface, a lower surface, a leading edge and a trailing edge, said combination including a casing disposed between said surfaces, a diaphragm in said casing positioned to define an upper chamber and a lower chamber in said casing, an upper duct connecting said upper chamber and said upper surface, said upper duct having an opening facing said leading edge of said wing, a lower duct connecting said lower chamber and said lower surface, said lower duct having an opening substantially in said lower surface of said wing, and a responsive means operated by a predetermined movement of said diaphragm.

3. A combination as defined in claim 2 but further characterized by said openings in said upper duct and said lower duct being located in the trailing part of said wing.

MILLARD JOHN BAMBER.

REFERENCES CITED

The following references are of record in the file of this patent:

UNITED STATES PATENTS

| Number | Name | Date |
|---|---|---|
| Re. 23,042 | Upson | Oct. 5, 1948 |
| 1,588,178 | Fales | June 8, 1926 |
| 2,356,847 | Holthe | Aug. 29, 1944 |
| 2,373,088 | Allen | Apr. 10, 1945 |
| 2,424,946 | Remy | July 29, 1947 |